United States Patent [19]
Blundell

[11] Patent Number: 6,054,817
[45] Date of Patent: Apr. 25, 2000

[54] THREE DIMENSIONAL DISPLAY SYSTEM

[76] Inventor: Barry George Blundell, Chateau de la Courcelle, 18370 Saint Priest la Marche, France

[21] Appl. No.: 08/930,786

[22] PCT Filed: Apr. 4, 1996

[86] PCT No.: PCT/NZ96/00028

§ 371 Date: Feb. 2, 1998

§ 102(e) Date: Feb. 2, 1998

[87] PCT Pub. No.: WO96/31986

PCT Pub. Date: Oct. 10, 1996

[30] Foreign Application Priority Data

Apr. 6, 1995 [NZ] New Zealand ............................ 270888

[51] Int. Cl.[7] .............................. H01J 29/80; G09G 5/00
[52] U.S. Cl. .................................. 315/375; 345/6; 345/7; 353/10
[58] Field of Search .................................. 345/22, 31, 6, 345/10, 13; 315/13.1, 364, 375; 342/180; 128/916; 313/149, 152; 348/51, 54

[56] References Cited

U.S. PATENT DOCUMENTS

| | | | |
|---|---|---|---|
| 2,967,905 | 1/1961 | Hirsch | 178/65 |
| 3,140,415 | 7/1964 | Ketchpel | 315/385 |
| 3,204,238 | 8/1965 | Skellett | 342/180 |
| 3,493,290 | 2/1970 | Traub | 359/479 |
| 4,132,919 | 1/1979 | Maple | 313/466 |
| 4,160,973 | 7/1979 | Berlin, Jr. | 340/718 |

(List continued on next page.)

FOREIGN PATENT DOCUMENTS

| | | |
|---|---|---|
| 0 310 928 | 4/1989 | European Pat. Off. . |
| 0 418 583 | 3/1991 | European Pat. Off. . |
| 0 491 284 | 6/1992 | European Pat. Off. . |
| 63-254647 | 10/1988 | Japan . |
| 5-022754 | 1/1993 | Japan . |
| 6-141349 | 5/1994 | Japan . |
| 94/06248 | 3/1994 | WIPO . |

OTHER PUBLICATIONS

R.D. Ketchpel, "Direct–View Three Dimensional Display Tube", pp 324–328.
Derwent Publications Ltd, London, GB; AN 75–K2117W & SU 426260 A, Apr. 24, 1975.
Patent Abstracts of Japan E 716, p. 129. JP 63–254647 A.
Patent Abstracts of Japan, E 402, p. 145, JP 60–257895A.
Patent Abstracts of Japan, P 1849, p. 132, JP 6–273693 A.
Patent Abstracts of Japan, E 1379, p. 25, JP 5–22754 A.
Patent Abstracts of Japan E 1595, p. 56, JP 6–141349.

*Primary Examiner*—Edward P. Westin
*Assistant Examiner*—John Patti
*Attorney, Agent, or Firm*—Foley & Lardner

[57] ABSTRACT

The present invention relates to improvements in a three-dimensional display system. A transformation technique is described wherein deflection coordinates defining the spatial locations of the images written into the display volume are determined by transformation from a coordinate system based on the display volume to a coordinate system based on the one or more electron guns. The application further relates to a technique by which the location of an electron beam within the display volume may be determined. These techniques involve positioning conductive material at various locations such as the screen and the enclosure of the display itself so that the impinging electron beam may be detected and thy the location of the beam in the display volume may be derived. Image enhancing techniques are described in conjunction with the location techniques whereby conductive films are evaporated onto the screen and/or the enclosure. Modifications in voxel plotting techniques are described so as to enhance the quality of the image produced in the display volume. The technique includes interlacing the scanned print location. An additional improvement is provided by a particular conduction medium configuration superimposed or deposited onto the screen where the conducting medium incorporates information which is extracted or read from the medium by scanning a particle beam across its face so as to invoke momentary voltages or currents in the conducting medium.

19 Claims, 13 Drawing Sheets

U.S. PATENT DOCUMENTS

| | | | |
|---|---|---|---|
| 4,692,878 | 9/1987 | Ciongoli | 345/419 |
| 4,754,269 | 6/1988 | Kishi et al. | 345/427 |
| 4,922,336 | 5/1990 | Morton | 358/88 |
| 4,974,946 | 12/1990 | Solomon | 359/446 |
| 4,983,031 | 1/1991 | Solomon | 353/10 |
| 5,703,606 | 12/1997 | Blundell | 345/22 |

NON-INTERLACED $f=f_0$     INTERLACED $f<2f_0$ (a)      (b)

PLAN VIEW
OF DISPLAY VOLUME

THREE DIMENSIONAL DISPLAY SYSTEM

BACKGROUND OF THE INVENTION

1. Field of the Invention

The present invention relates to a system for displaying three dimensional images. More particularly, but not exclusively, the present invention relates to improvements in such systems in the areas of electron beam deflection transformations, beam registration techniques, interlacing techniques, data processing and filtering, signal processing and methods and apparatus for providing inbuilt security and/or a unique identification means.

2. Description of the related Art

Reference is made to PCT/NZ93/00083, which is herein incorporated by reference. PCT/NZ93/00083 broadly relates to a system consisting of a rotating phosphor coated screen and one or more electron guns writing images to the screen (the 'cathode ray sphere'). As the screen sweeps out a display volume within an evacuated chamber, the one or more electron guns fire at the screen to excite the phosphor coating to produce illumination at the required regions in three dimensional space.

This specification will adopt the terminology of PCT/NZ93/00083 where applicable. Each point illuminated in the display volume is referred to as a "voxel". A voxel is a point in three dimensional space which forms part of a three dimensional image. A voxel is a three dimensional analog to a pixel in a two dimensional display system, for example: a computer monitor.

As discussed in PCT/NZ93/00083, it is known to calculate the required X and Y deflection angles of an electron beam by means of trigonometric expressions involving the radial and vertical locations of the voxel in the display volume, the screen angle at that point and the position of the electron gun relative to the display volume. However, this approach assumes that the gun is located precisely at the position and orientation assumed in the transformation equations. In practice, the gun will be slightly misaligned leading to errors in the position of the voxels if the ideal trigonometric expressions are employed. Attempting to take such misalignment in to account by trigonometric expressions leads to very complex and computationally expensive equations for the deflection coordinates. The level of precision in gun positioning required by this display makes reliance upon mechanical alignment undesirable. The abovementioned application also described deflection equations which assumed that the electron guns were on the equator and the positions known accurately. It would be desirable to be able to calculate deflection values for the guns above or below the equator.

To detect the presence of the electron beam impinging on the screen, and more particularly to detect the orientation of the screen at any particular time, NZ/93/00083 describes a technique whereby a conductor is affixed to the perimeter of the screen. As the electron beam passes over and strikes the conductor a current pulse is produced in the conductor. The current pulse is processed by a detection circuit. The technique described in PCT/NZ93/000083, of placing a wire around the screen periphery is problematic in that it is difficult to accurately and securely place such a conductor onto the screen in such a way that rapid rotational movement of the screen will not displace it and so that it does not cause any visual obstruction of the image. Also, as the electron beam passes over a thin conductor the current "spike" produced may be difficult to extract from a noisy background and therefore the accuracy of the screen position derived from the abovementioned measurement will be reduced.

It has also been found that charge buildup on the screen may result in distortion of the electron beam as a result of electrostatic repulsion. Accordingly, it would be advantageous to provide an exit path for the electrons from the beam which are incident at any point on the screen.

To avoid addressing the screen at acute angles, the changeover between guns addressing the screen could be made gradually. This is in contrast with PCT/NZ93/00083where the changeover is effected abruptly at a specific screen position.

The display unit of the present invention may incorporate information specific to that device and be controlled by proprietary software. It is therefore desirable that there exist some secure means of validating the use of such a peripheral and/or by which information relating to the characteristics of the screen may be communicated to the controlling computer. This may also be particularly appropriate where specialised control software is sold with a display system. In this situation, it is an advantage to be able to uniquely identify a display device in order to match it with a particular piece of software.

Many techniques have been used to date to prevent the unauthorised use of software or apparatus. These techniques include the use of protected software, dongles, etc. These approaches have had mixed success, and are not well suited to provide security for the cathode ray sphere. It is therefore desirable to incorporate some means of identification in the three dimensional display system.

To reduce image flicker, a further extension to PCT/NZ93/00083comprises implementing a technique analogous to interlacing employed on two dimensional raster scanned terminals.

It has been found that the contrast of an image produced in a cathode ray sphere is adversely affected by the presence of background or extraneous light entering the display volume from behind the volume (with respect to the observer). It is therefore desirable to reduce the amount of this background illumination and thus enhance the image contrast.

It is an object of the present invention to provide a three dimensional display system which produces true three dimensional images accurately in such a way as to overcome the above mentioned difficulties, or to at least provide the public with a useful choice.

SUMMARY OF THE INVENTION

According to one aspect of the invention there is provided a display system comprising:

An evacuated enclosure, at least part of that enclosure being transparent;

A phosphor coated screen within the enclosure;

Means to rotate the screen within the enclosure so that the screen sweeps out a display volume;

One or more electron guns within the enclosure positioned so that images may be written to the screen as it sweeps out the display volume;

and control means to provide drive signals to the one or more electron guns in accordance with image information supplied thereto, wherein deflection coordinates defining the spatial location of the images are determined by transformation from a coordinate system based on the display volume to a coordinate system based on the one or more electron guns.

Preferably the transformation is determined by means of a matrix, the matrix having elements corresponding to: the horizontal component of the separation of the origins of the two coordinate systems: the vertical component of the separation; the angle of rotation of the one or more electron guns about the one or more electron guns own axis; and the screen angle.

Preferably the determination of the matrix elements is repeated a plurality of times from a number of locations around the screen and may be subsequently averaged.

In a further aspect the present invention provides for a means by which the presence of an electron beam within the display volume may be detected, the means comprising: a conductive material applied to the screen, the conductive material being adapted to provide a signal when an electron beam impinges upon the screen.

Preferably the conductive material is in the form of a conductive coating applied to one or both faces of the screen.

Preferably the coating is adapted to be translucent or transparent.

In a further aspect, the conductive coating may be either between the screen and the phosphor or on top of the phosphor coating.

In an alternative embodiment the present invention provides for a means whereby the location of an electron beam within the display volume may be detected, the means comprising: one or more areas of conductive material applied to the interior or exterior of the evacuated enclosure, the conductive material adapted to provide a signal when an electron beam impinges upon the enclosure interior surface.

Preferably the conductive coating on the enclosure interior or exterior surface is transparent or translucent.

Preferably the conductive coating may comprise a metal, or alternatively a metallic compound such as indium tin oxide, the conductive coating being produced by vacuum deposition or a similar technique known in the art.

In an alternative embodiment, the conductive coating on the exterior or interior surface of the enclosure covers portions of the surface.

In a further aspect, the present invention provides a means of increasing the image contrast whereby a layer adapted to attenuate the light intensity, is arranged so as to attenuate the background light admitted into the enclosure.

Preferably the layer comprises a thin layer of gold or other conductive material.

The present invention further provides for a method whereby images comprising arrays of points, the points herein referred to as voxels, corresponding to the intersection of the electron beam and the phosphor coating, wherein alternate voxels are plotted during successive screen revolutions, the plotting being adapted so that the overall image refresh frequency is reduced and the voxel bandwidth increased.

According to a further aspect of the invention, there is provided a method of identifying an article, the article having a plurality of conductive symbols affixed thereto electrically connected to a common conductor, the common conductor being electrically connected to a detection means for detecting the presence of an electric current.

In a further aspect of the invention there is provided a method of identifying an article whereby an electron beam is scanned across at least some or part of the symbols thereby inducing a current in the symbol whereby the current produces an output signal from the detection means, the signal containing information corresponding to the symbols which may be adapted to identify the article.

The symbol or symbols may be in the form of a barcode, letters, numbers, geometric forms or any other desired combination of shapes.

The present invention also provides for an article incorporating identification means comprising a plurality of symbols formed of conductive material electrically connected to a common conductor and affixed to the article.

The present invention further provides for a method of blending the regions addressed by each electron gun, wherein the changeover between successive guns addressing the screen is effected gradually.

BRIEF DESCRIPTION OF THE DRAWINGS

Further objects and advantages will become apparent in the following description which will be described by way of example only, and with reference to the accompanying drawings in which.

DESCRIPTION OF SPECIFIC EMBODIMENTS

Figure 1:
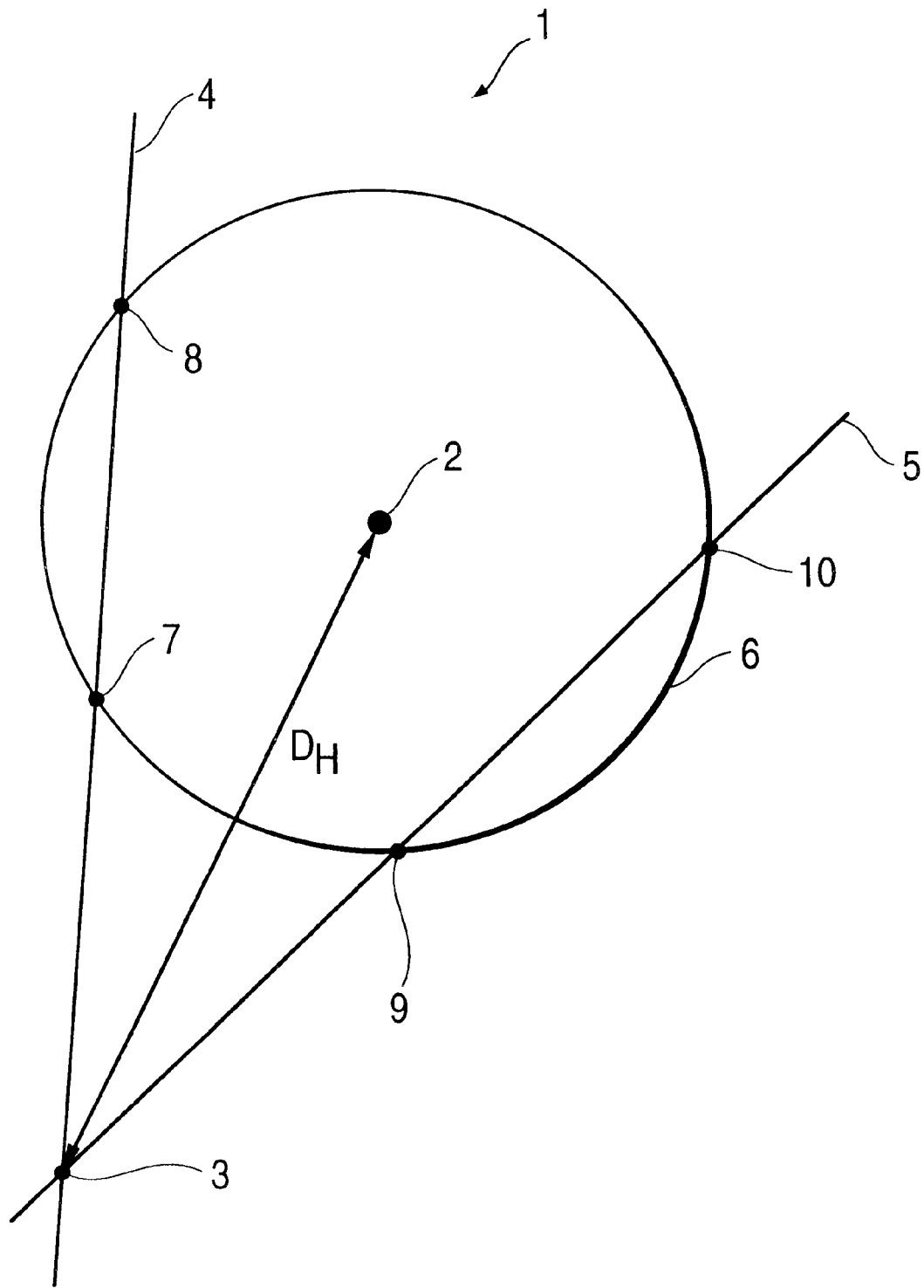
FIG. 1 Shows a plan view of the display volume, wherein the means by which the horizontal component of the reference frame separation, $D_H$, is determined. The horizontal component of separation is shown as being defined by the intersection of two lines interpolated through the detected points where the beam enters and leaves the display volume.

The following discussion assumes a familiarity with the operation of the three dimensional display as described in PCT/NZ93/00083. The operation of such a display is briefly summarised as follows:

A phosphor covered screen within an evacuated enclosure rotates and sweeps out, in the case of a rectangular screen, a cylindrical volume. One or more electron guns is directed generally at the centre of the screen. It will be appreciated by one skilled in the art that the rotating screen produces a three dimensional volume that may be considered as composed of adjacent thin sectors within each of which the screen resides in turn for a short time during it's rotation. The present invention is not restricted to a rectangular screen and it is envisioned that other screen shapes are possible within the constraint that the screen incorporate a straight edge. It is also envisaged that the screen may be not be flat. It may be advantageous to have either a screen tilted off the vertical axis, or incorporate a twist over its height. This is for the following reason: Generally images written to the display volume will incorporate many vertical line elements. For a vertical or non-twisted screen, the voxels producing such an image will be in the same sector. In contrast, if the screen is tilted, a vertical line element will have it's voxels spread over a number of sectors. This can increase the efficiency with which the image can be written to the display volume. An electron beam emitted by the one or more guns may be scanned or deflected to a desired position at a particular moment thereby exciting the phosphor calculated to "inhabit" a known spatial location at that moment. Virtually any point within the cylindrical volume of the display may be illuminated by an arrangement of electron guns. With a knowledge of the speed of rotation of the screen and the location of point of intersection of the electron beam and the screen, a three dimensional image may be generated. For further details the reader is referred to PCT/NZ93/00083.

It is sufficient for the purposes of this specification to refer to the general operating properties of such a display.

In order for voxels to be accurately reproduced in the display volume, the X and Y deflections applied to the electron beam and the timing of the beam pulses, which are synchronised to the screen rotation, must be determined. As discussed above, previously known techniques for computing the required deflection angles have employed trigonometric expressions involving the radial and vertical location of each voxel in the display volume, the screen angle at that point and the position of the electron gun relative to the display volume. This approach assumes that the gun is precisely located at the position and orientation assumed in the transformation equations. Constructional difficulties insure that the gun will inevitably be slightly misaligned. This will lead to errors in the positions of the voxels and also nonlinear propagation of the beam.

A novel approach for calculating the deflection angles is as follows. Rather than assuming a specific ideal reference frame for the electron gun, relative to the reference frame of the display volume, and then determine deviations from this, the reference frame of the gun is defined to be that corresponding to the actual physical location of the gun. Therefore, by definition there are no deviations of the gun from this frame of reference so the geometry relating the beam deflections to voxel positions in the display volume is trivial. While the deviations from the ideal reference frame need not be determined, the actual relationship between the reference frame of the display volume and electron gun does need to be determined. However, once this relationship has been determined it is encapsulated in a single transformation matrix and the deflection calculations for each voxel are relatively straightforward.

The mathematical form of the new transformations is that of a matrix multiplication rather than a trigonometric formula. The spatial relationship between the two coordinate systems is described by a single 4×4 homogeneous transformation matrix. The parameters governing the transformation from the display volume coordinate system to the electron gun coordinate system or, equivalently, the positions and orientation of the display volume in the reference frame of the electron gun, must be determined.

The 4×4 transformation matrix M acts on a 4×1 vector P, the first three elements of which are the (x,y,z) rectangular position coordinates of the voxel in the display volume. The fourth element is a scaling parameter which is not used and is set equal to unity. The vector is thus $(x,y,z,1)^T$.

For any combination of rotations and translations, the matrix M has the form $$\begin{bmatrix} r_{11} & r_{12} & r_{13} & t_1 \\ r_{21} & r_{22} & r_{23} & t_2 \\ r_{31} & r_{32} & r_{33} & t_3 \\ 0 & 0 & 0 & 1 \end{bmatrix}$$

Where the 3×3 upper left submatrix specifies the rotations, and the right hand 3×1 vector corresponds to the translation.

Before discussing the beam registration method, the means by which the position of the electron beam within the evacuated enclosure is determined must be addressed. As discussed in PCT/NZ93/00083, in single and multi-gun systems it is important that the guns are properly aligned with the screen to minimise image distortion. In multiple gun displays it is also important that the guns are accurately aligned to ensure smooth transitions between image portions written by different guns. Accurate gun alignment also becomes critical in situations where the electron guns address the screen at acute angles. Clearly in such a beam/screen geometry, the spatial position of the voxels will be very sensitive to gun misalignment. Gun alignment during production will be difficult and expensive. Furthermore, this technique would require retuning and realignment of the system should the guns become misaligned or the amplifier characteristics vary. Variations in the linearity of the electron beam will also be affected by the non-ideal behaviour of the amplifier and the deflection plates. Non-linearity in the amplifier response and the beam deflection as a function of plate voltage will also effect the deflection linearity.

Accordingly, it is desirable that the actual location of the electron beam relative to the display volume be known at any instant. PCT/NZ93/00083described a method whereby a thin conductor (in that embodiment, a wire) is secured around the perimeter of the screen.

When an electron beam hits the wire it generates a current which is detected by the detection circuit. The output signal is supplied to a control computer and using this signal, a number of measurements, such as determining the positions at which the screen is perpendicular to the beam of the particular gun and the angular position of the screen at any moment, can be made. By conducting a number of sweeps horizontally and vertically across the screen, gun misalignment may be calculated and in turn compensated for. Also if the conductor is provided around the perimeter of the screen, the computer knows the X and Y deflection plate values within which the images must be written.

A novel alternative to employing a thin conductor around the screen periphery is locating a thin, transparent conductive coating deposited over the entire screen face. A similar electrical connection as that described in PCT/NZ93/00083 enables a current to be detected when the electron beam impinges upon any part of the screen.

The conductive coating is applied to both faces of the screen and is sufficiently thin so as to be transparent or translucent. The coating may be gold, aluminium or any similar material. Alternatively, glass precoated with a conductive Indium Tin-Oxide coating may be employed.

Deposition of such a layer may also be carried out by evaporation in vacuo or by similar techniques known in the art.

A further advantage of the present technique over the previous conductor configuration, is that by providing an exit path for the electrons from the beam, charge build up on the screen surface is reduced considerably. Such static charge build up may distort the beam path by electrostatic repulsion. Accordingly, a reduction in any such charge buildup will produce a sharper, more clearly defined image.

The conductive coating may be either on the surface of the phosphor or between the phosphor layer and the screen. However, in the case where the coating is on top of the phosphor layer, the thickness of the conductive coating will result in some internal reflection or dimming of the voxels due to the light being attenuated by the conductive coating. If the coating is beneath the phosphor layer, the signal may be weaker and there may also be some asymmetry in the brightness of the voxels as perceived from each side of the screen. This arises due to the light from the voxels created on one side having to pass through two layers of the coating before exiting the screen onto the other face. Accordingly, it is to be preferred that the layer configuration provide an optically symmetrical path for light being emitted from a voxel, that is, the former configuration is to be preferred.

It will be appreciated that both the conductive and the phosphor layers should be sufficiently thin to insure a high degree of transparency and uniformity in voxel brightness. A corollary to this is that the screen itself should be as thin as possible to reduce visual dead zones.

Figure 13:
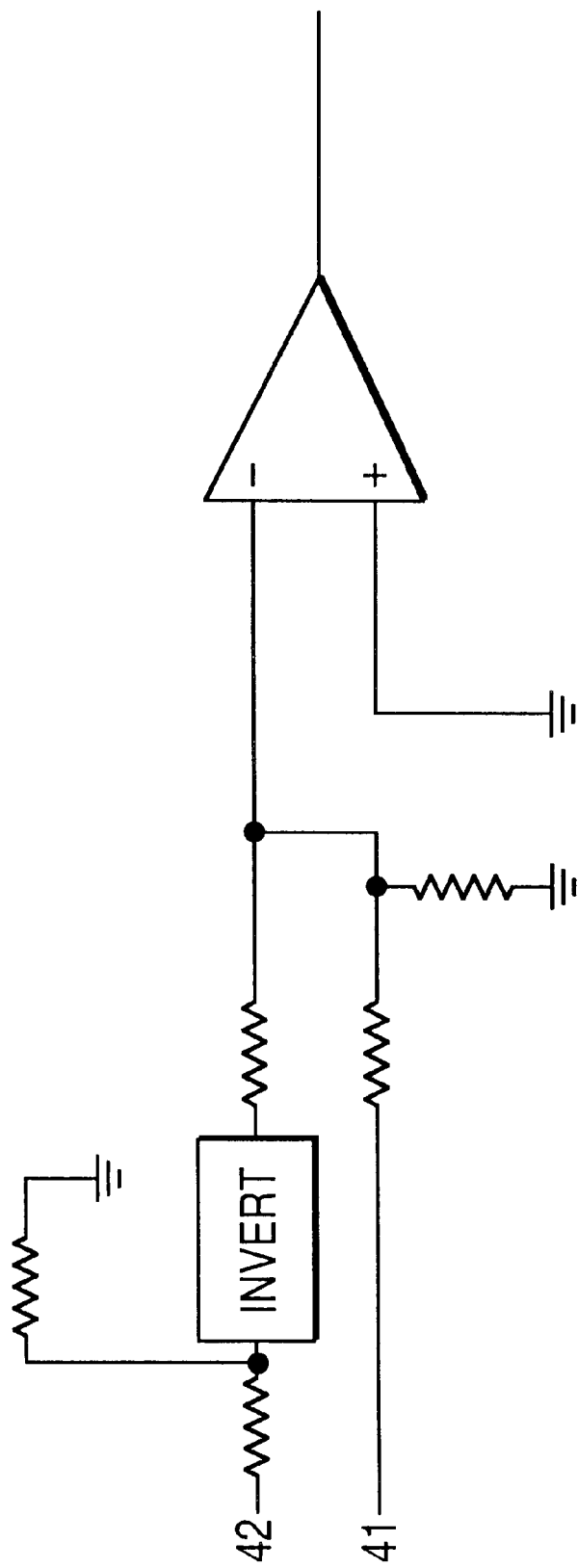
FIG. 13 Illustrates a circuit used for amplifying the edge 'transition' pulse.

A transparent conductive coating may also be applied to the inside of the display vessel itself. Such an inner conductive coating can be used to detect the "shadow" of the display screen. As an electron beam scans the interior of the vessel, a current signal picked off the interior coating corresponds to the electron beam missing the screen. Alternatively, a conductive coating may be applied to the exterior of the enclosure. Both interior and exterior coatings may be in patches, or some other desired shape. When an electron beam is incident on the interior of the enclosure, a charge is induced in the conductive layer on the exterior of the enclosure. This is caused by a capacitance effect which can be used to provide a signal which corresponds to the beam striking the enclosure interior. The above signals may be used to aid in beam positioning. Referring to FIG. 13, consider a beam scanning across a conductive screen. When the beam hits the screen a current is produced. This is fed into an input in this conductive coating 41 which converts the current into a voltage. When the beam crosses the screen edge and hits the interior of the enclosure, a current of opposite sign results. This is fed into an input 42 which converts it into a voltage. One of the voltages is inverted and the two voltages are summed producing a signal representing the transition which is increased by a factor of 2. The efficacy of this technique depends on the level of background noise accompanying each of the voltages, and in unfavourable circumstances the background may also be magnified.

A further advantage of locating a conductive layer or layers on the enclosure (exterior or interior) is that the gun-to-detection distance will be significantly increased (for the geometry where the detection point is behind the grazing point on the edge of the screen). This will have the effect of reducing the error in the determination of the geometrical values required for the transformation element calculation. A similar error reduction will be observed where the time difference between the beam grazing the screen at two angles is measured. For both grazing events, if the signal is derived from a conductive coating on the enclosure, the timing error will be reduced.

Such signals can be used in conjunction with other beam scan parameters to aid in beam registration.

Referring to FIG. 1 the determination of the 'virtual origin' 3 is shown. The virtual origin (that is, the apparent point of origin of the electron beam) is used in the determination of $D_H$. Pairs of points 7, 8 and 9, 10 may be measured by the above technique. By interpolating back to the origin as indicated by the lines 4 and 5, the virtual origin may be found. Such an origin is independent of the actual physical beam origin, and in any event, a physical measurement of such a point will have little meaning.

One beam registration method applied to a display device with a screen coating configuration described as above, is as follows:

The following treatment assumes that the electron gun is located with a high degree of mechanical precision, so that it is known approximately where the undeflected beam is directed. It is also assumed that the undeflected electron beam passes through the middle of the display volume (the origin of the display volume coordinate system).

The form of the transformation matrix M is $$\begin{bmatrix} a_1 & b_2 & c_3 & t_1 \\ a_2 & b_2 & c_2 & t_2 \\ a_3 & b_3 & c_3 & t_3 \\ 0 & 0 & 0 & 1 \end{bmatrix} \begin{bmatrix} \cos\phi & -\sin\phi & 0 & 0 \\ \sin\phi & \cos\phi & 0 & 0 \\ 0 & 0 & 1 & 0 \\ 0 & 0 & 0 & 1 \end{bmatrix}$$

The right hand matrix describes the effect of a rotation $\phi$ of the gun about its own optical axis. The left hand matrix describes the translations and rotations required to transform the rectangular coordinate system of the display volume (where the z axis is vertical) to that of the electron gun (where the x and y axis coincide with the $-X$ and $Y$ deflection directions and the z axis is directed along the optical axis of the gun and, as assumed in this treatment, intercepts the origin of the display volume coordinate system).

The elements ($t_1$, $t_2$, $t_3$) describe the translation relating the origins of the two coordinate systems:

$$t_1 = D_H \cos\theta$$
$$t_2 = D_H \sin\theta$$
$$t_3 = D_V$$

In which $\theta$ is the angle of the x and y axis of the display volume coordinates system relative to the gun, $D_H$ is the horizontal component of the separation of the two coordinate system origins and $D_V$ is the vertical component.

The elements ($c_1,c_2,c_3$) are given in terms of ($t_1,t_2,t_3$) as $$(c_1,c_2,c_3)=(-t_1,-t_2,-t_3)/(\sqrt{(t_1^2+t_2^2+t_3^2)})$$

and ($b_1,b_2,b_3$) are:

$$(b_1,b_2,b_3)=(-\cos\theta\sin\alpha, -\sin\theta\sin\alpha, \cos\alpha),$$

where $\theta=\arctan(t_2/t_1)$ and $\alpha=\arccos[(\sqrt{t_1^2+t_2^2})/(\sqrt{(t_1^2+t_2^2+t_3^2)})]$ The elements $(a_1,a_2,a_3)$ are then obtained from the above by the cross product $a=b\times c$, that is, $$(a_1,a_2,a_3)=(b_2c_3-b_3c_2, b_3c_1-b_1c_2, b_1c_2-b_2c_1)$$

The numerical values of these matrix elements must be determined in order to perform the transformation.

All the elements in the transformation matrix M are derived from the four parameters $D_V$, $D_H$, $\theta$ and $\phi$.

The horizontal component of the reference frame separation, $D_H$, is determined by scanning the beam through the display volume at zero vertical deflection. The beam is deflected on either side of the rotation axis as indicated by lines 4 and 5 in FIG. 1. The beginning and end of the pulse registered via the conductive screen correspond to the electron beam entering and leaving the display volume. (i.e., intersecting the display volume created by the rotation of the rectangular screen). By determining the angles corresponding to these extremities, the (x, y) coordinates of these points in the display volume frame can be determined. By interpolating a straight line through each set of two points (one on either side of the screen rotation axis) the intersection of these lines give the horizontal location, in the display volume coordinate system, of the electron gun.

Once the (x, y) position of the gun in the display volume reference frame is known, the angle $\theta$ at which the screen is normal to the horizontal component of the optical axis of the gun may be determined.

The rotation angle of the electron gun about its own axis is determined by deflecting the beam until it just grazes the edge of the screen when the screen is normal to the optical axis of the gun. The normal position is identified by synchronising the beam to the screen rotation so that the beam is gated on only as the screen passes through this position. This procedure is carried out at several locations around the edge of the screen. In this treatment we consider a deflection of the electron beam to the upper right hand of the screen as seen from the gun. The beam is then moved slowly vertically. If an upward motion results in the signal disappearing then the beam is moved down and vice versa. In this case the signal will reappear as the beam is moved down. By moving the beam downward a certain amount, and then deflecting it outward until the edge of the screen is detected again, the angle $\phi$ may be deduced from the geometry. The above determination may also be performed by circularly deflecting the electron beam and detecting the points at which the circular scan pattern is symmetrically superimposed onto the screen. This technique will only be suitable for certain screen geometries.

Figure 2:
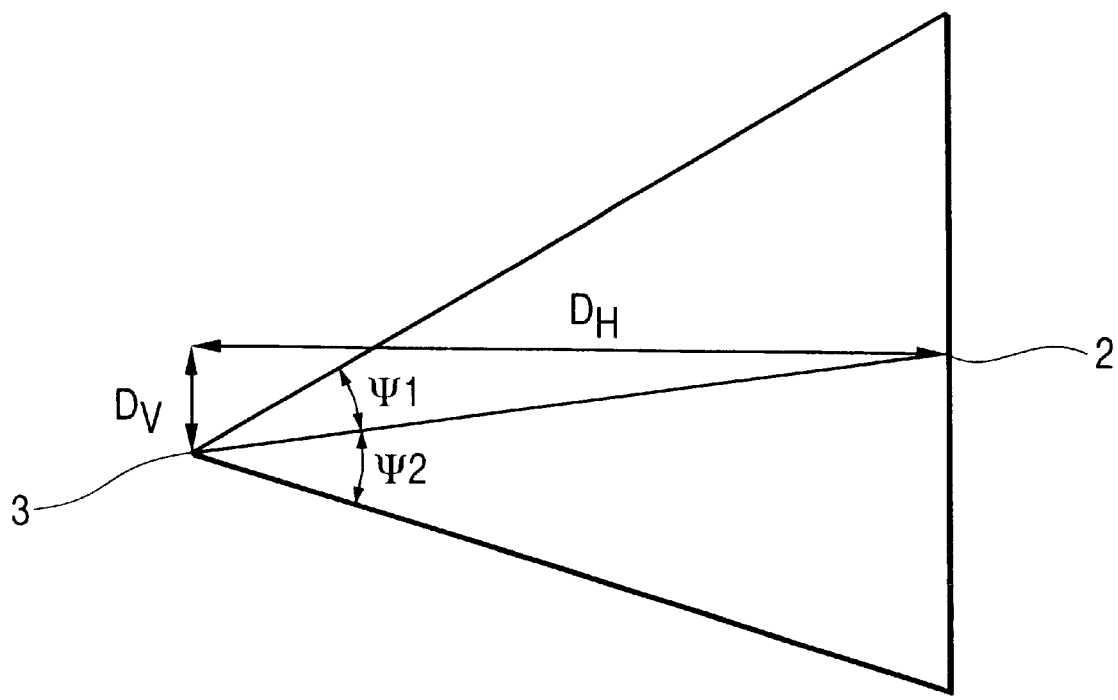
FIG. 2 Shows a plan view of the display volume, illustrating the geometry from which the vertical component $D_V$ of the separation of the reference frame origin is derived.

The vertical component $D_V$ of the separation of the two coordinate system origins 2 and 3 is determined from the geometrical construction shown in FIG. 2. The electron beam is deflected vertically upward and downward and the deflection voltages at which the beam just grazes the edge of the screen are measured. The geometry in FIG. 2 leads to an expression for $\Psi_1/\Psi_2$ containing $D_V$. $\Psi_1$ and $\Psi_2$ are the vertical deflection angles in FIG. 2. The expression cannot be analytically manipulated to extract $D_V$. Accordingly, $D_V$ must be determined numerically from the expression.

Figure 3:
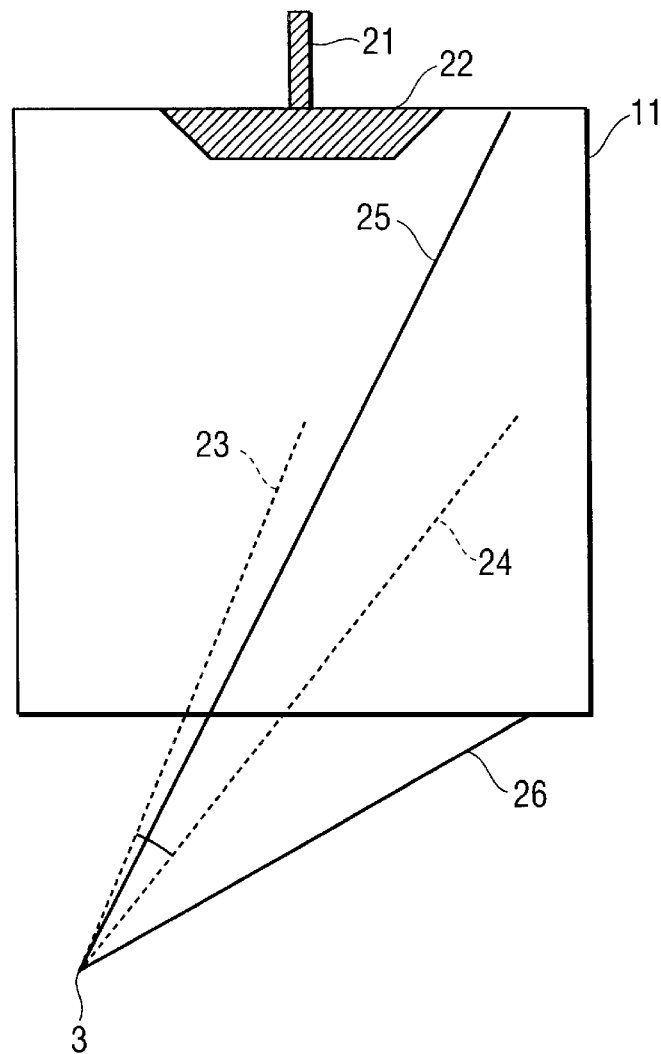
FIG. 3 Illustrates how the presence of the mount securing the screen to the rotation shaft restricts the orientation of the $D_V$ electron scan. The determination of $D_V$ must occur at an angle $\Psi_x$ from the plane representing the horizontally undeflected beam scanning path. Normally, the screen would be secured from below.

As shown in FIG. 3, in practice it is unlikely to be feasible to employ a purely vertical deflection in order to determine the deflection voltages at which the beam 23 grazes the edge of the screen 11. This is because the screen 11 is attached to the shaft 21 with a clip 22, which will obscure the conductive edge of the screen. Therefore, the above method could be carried out toward one side of the screen (at a constant horizontal deflection) as shown by beams 24, 25, and 26 in FIG. 3.

To minimise error in the result obtained by the above procedures, each measurement is repeated a number of times to determine an average value for each parameter. The spread of values around the average will also indicate the reliability of the beam registration procedure.

Where possible the procedure should also be carried out in different areas of the screen or display volume. For example, the determination of $\phi$ should be performed at various locations around the edge of the screen and the determination of $D_V$ should be performed on either side of the rotation axis of the screen.

The matrix transformation provides the added advantage that the guns are not assumed to be on the equator. They may be up to approximately 45° above or below the equator.

A further improvement to the display system of PCT/NZ93/00083 is that the changeover between guns addressing the screen may be carried out gradually. Over a certain range of screen positions both beams could address the screen, each drawing some of the voxels in that region.

For a display device such as that described in PCT/NZ93/00083, it is often highly desirable that the display system hardware be able to be uniquely identified. Such identification may be in the form of encoding onto the display, at the time of manufacture, information such as operating parameters, serial numbers, or copyright protection information. Such operating parameters may include the physical dimensions of the display screen, colour capability, scan format, or even segments of software to be used by the controlling computer.

In the case where such information is to be used for authentication of the hardware system, in a manner analogous to that of a hardware protection device on a computer, it is important that the information be encoded in a manner that is secure and inaccessible to the user. To this end, a conducting barcode affixed to the display screen in vacuo represents a virtually tamper-proof identification device.

Figure 4:
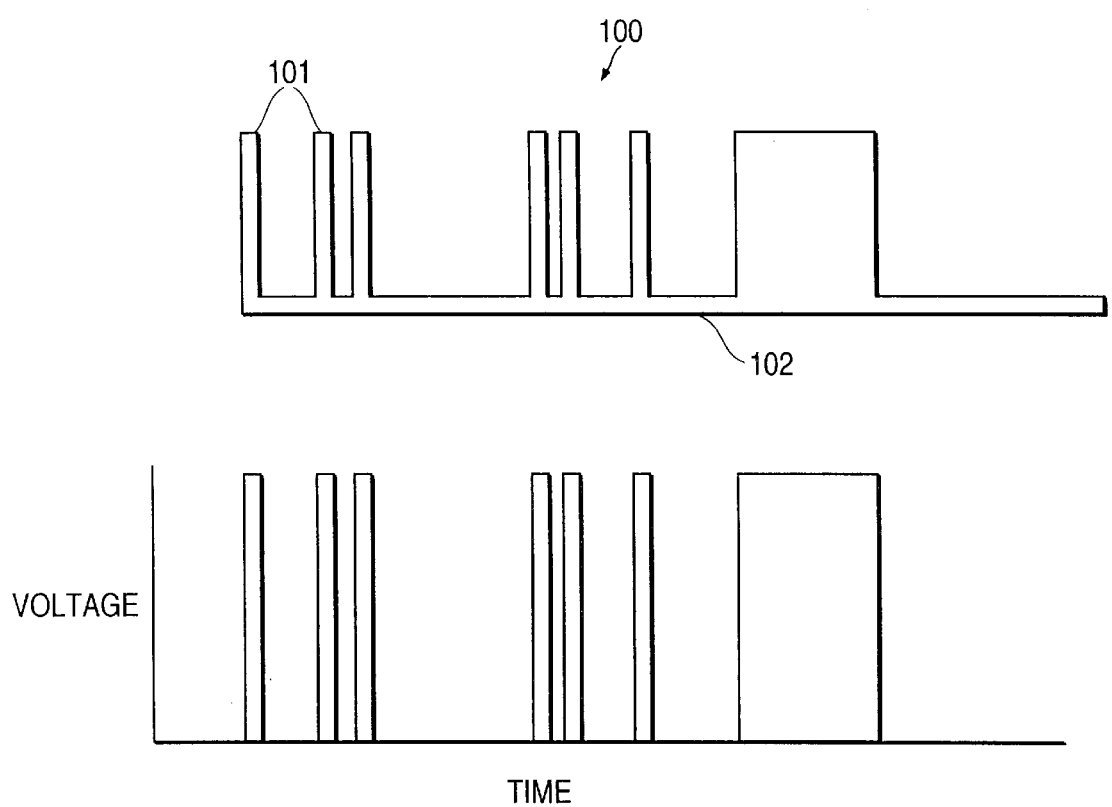
FIG. 4 Illustrates diagrammatically a screen in which a single conductor in the shape of a barcode is affixed to the lower edge of the display screen.
Figure 5:
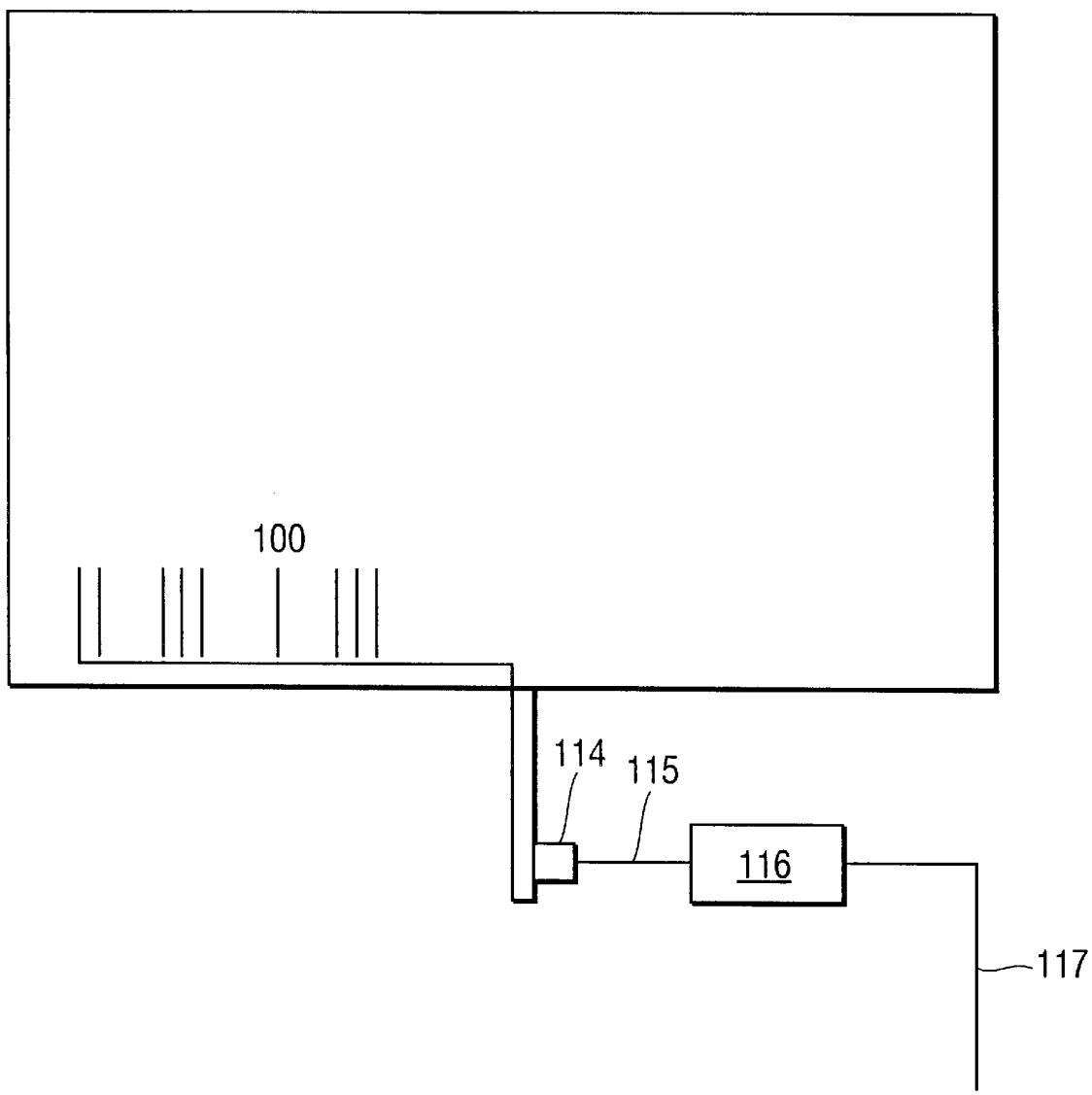
FIG. 5 Illustrates diagrammatically an arrangement whereby an electron beam scans a conductive barcode pattern, thereby producing a train of pulses which are processed by a detection circuit.

Referring to FIG. 4 and 5 the preferred arrangement for writing and reading the encoded information is shown. In this embodiment, the information is encoded as a barcode shaped conductor secured on the perimeter of the screen, various algorithms for encoding information in the form of a barcode being known in the art. Referring to FIG. 4, a display screen 100 has a barcode formed of conductive material affixed thereto. Conductive barcode elements 101 are electrically connected to common conductor 102. Common conductor 102 is electrically connected to detection means 116 show in FIG. 5.

It is to be understood that although the axis of the barcode in this example is parallel to the horizontal display screen axis the barcode axis may be positioned in any orientation constrained by the requirement that it be possible to scan it with the electron beam. The position of the barcode is also governed by the necessity to not interfere with the image, being written to the display volume produced by the electrons impinging on the phosphor.

To read a barcode an electron beam is scanned across at least a portion of the barcode 100. The barcode may also be read in such a manner that only a part of the barcode is scanned at any one time thereby increasing the difficulty with which the information might be deciphered by an unauthorised party.

When an electron beam hits conducting barcode segments 101 a current is generated which flows via common connector 102, shaft 114 and line 115 to detector 116. Detector 116 produces an output signal which may be supplied to a control computer via line 117. The barcode is read by scanning the electron beam along the axis of the barcode at a constant y plate deflection voltage. Whenever the electron beam hits a conducting portion of the barcode a signal is supplied to the control computer via line 117. Thus, one complete scan along the axis of the barcode will produce a train of signals which may be decoded to yield the information contained in the barcode. It will be appreciated that if the beam scans at a constant speed across the barcode a train of pulses will be produced spaced in accordance with the spacing of conductors of barcode 100.

The conducting barcode may be formed on the display screen by vacuum deposition, electroplating or some such other technique as known in the art. The preferred material to form the conductor is Indium Tin-Oxide or whatever conducting material is used to coat the sphere and/or screen. However, other conducting materials or combinations of conducting materials may be suitable.

The physical dimensions of the barcode are, at one extreme, constrained by limitations of the chosen manufacturing technique, the scanning resolution of the electron beam, and the required information density, and at the other extreme, by the requirement that the volume swept out by the barcode not interfere with or obscure the image.

It is to be understood that although this embodiment is described by way of a conducting barcode example the conductor pattern may be in the shape of letters, symbols, or any arbitrary 2-dimensional shape such that an electron scan along a predefined axis will yield a signal train that may be processed or recognised by the controlling computer.

Reading of the encoded information will normally occur at the start up of the display. However, for the purposes of authentication, periodic scans may be carried out during operation.

While the article to which the identification means is affixed is currently envisaged to be the three dimensional display screen as described in PCT/NZ93/00083, it is believed that the technique may find application in other vacuum display devices such as cathode ray tubes etc.

A method of increasing the maximum number of voxels that may be displayed during each image refresh cycle, is to employ a technique analogous to the interlacing method used on raster scanned terminals.

Figure 6:
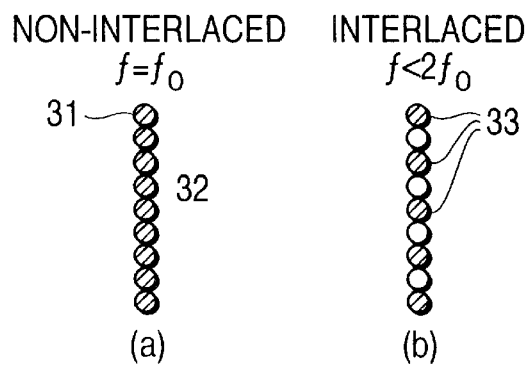
FIG. 6 Illustrates voxel patterns resulting from a noninterlaced (a) and interlaced (b) scan.

Such a technique implemented on the cathode ray sphere is as follows: Rather than plotting each screen revolution every point 31 in an image element 32 such as a line, alternate points 33 may be plotted in successive revolutions (see FIG. 6). However, in order to avoid increased flicker, the screen rotation rate must be increased until the severity of the flicker and the continuity of the lines is the same as for the noninterlaced images.

This technique will be preferable if more voxels can be depicted in the display volume (with the same activation time per voxel) each second. If the images are assumed to comprise only primitives to which such an interlacing technique can be applied (such as lines or arcs), this requires that the rotation frequency $f$ with interlacing be less than double the noninterlaced frequency $f$. If the image contains additional primitives such as individual points, to which such interlacing can not feasibly be applied, then the fraction of voxels in the image that may be interlaced (now less than one) will reduce further the "break even" rotation frequency factor (less than two rather than two for images comprising lines and curves only).

Figure 7:
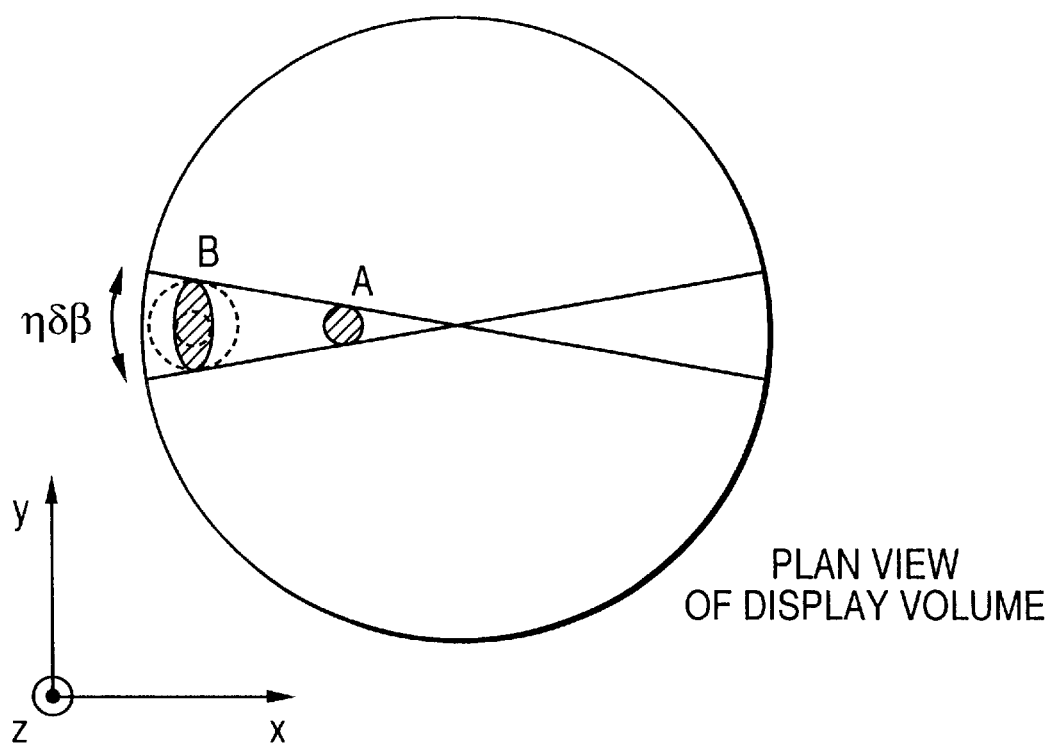
FIG. 7 Shows a plan view of the display volume, illustrating how the tangential component of the maximum voxel density decreases with the increasing distance from the rotational axis of the screen.

An additional difficulty with operation of the display device described in PCT/NZ93/00083 is that there exists a physical restriction on the length of time it takes to create a voxel. During this "creation time", the target screen moves through a small angle, shown as angle in FIG. 7. Accordingly, there is a limit on the angular voxel density which can be achieved in the display volume. The tangential component of the maximum voxel density therefore decreases with increasing distance from the rotation axis of the screen (see FIG. 7) as shown by voxels A and B in FIG. 7. In addition there are a number of nonuniformities in the resolution and positioning accuracy through the display volume, arising primarily due to the varying angle between the target screen and the electron gun. However, it is desirable that the display volume behave, from the user's point of view, as a three dimensional Cartesian space—analogous to a two dimensional graphics terminal. One method of achieving this is to filter the voxels prior to their depiction in the display volume, to such a density uniform in each of the three perpendicular Cartesian directions that can be supported anywhere within the display volume. Thus, if an image is translated to a different part of the display volume there will be no reduction in the amount of information being depicted.

It is envisaged that such a filter may be implemented in software but such an implementation is likely to be computationally expensive and unlikely to enable real time interaction with the displayed image. Therefore, such a filter may be implemented in hardware or applied as a filter in software to individual images as desired.

It is further envisaged that the above interlacing technique may be applied to lines and curves lying in essentially a radial plane, in order to reduce angular voxel congestion.

Figure 8:
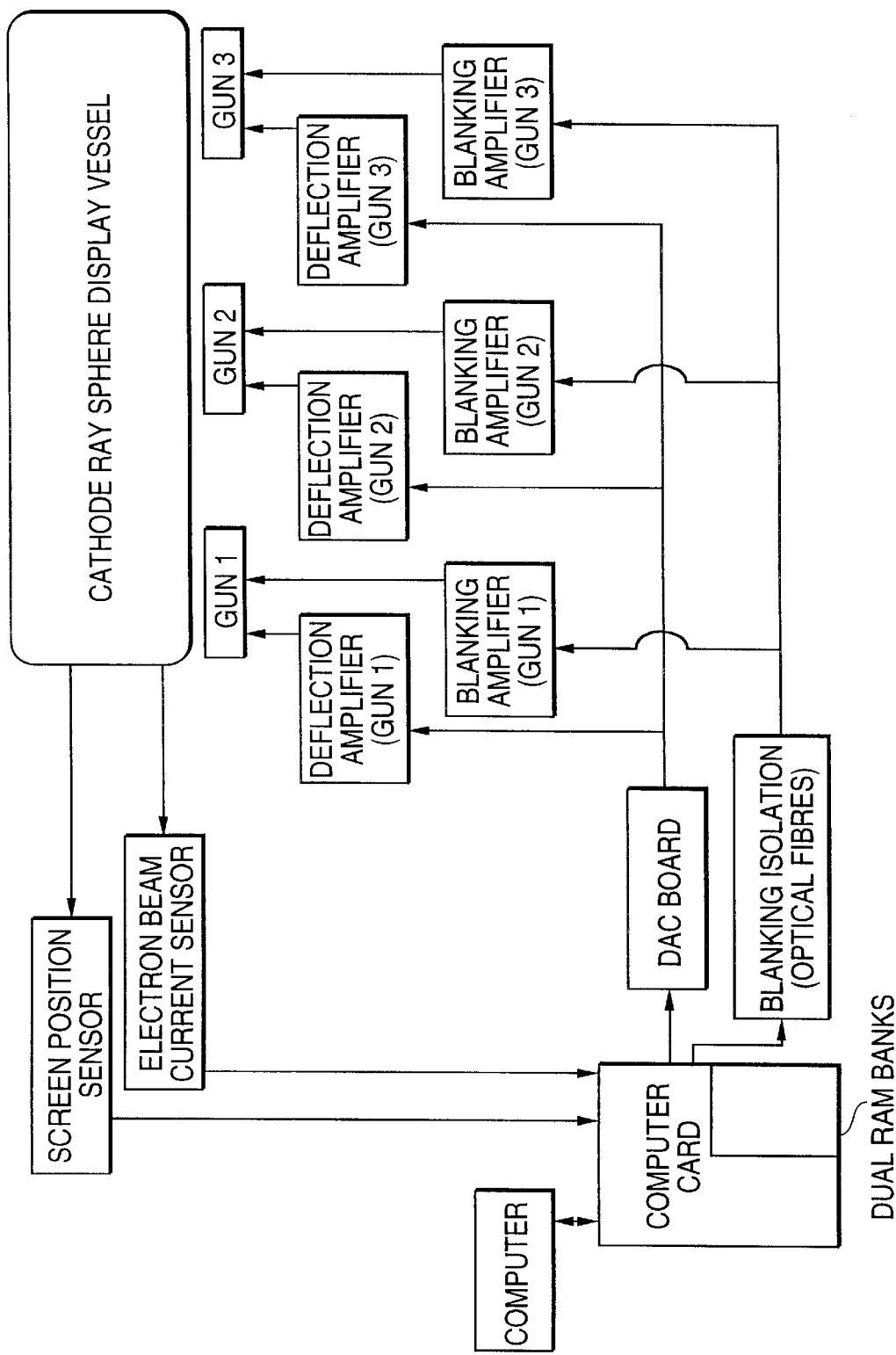
FIG. 8 Shows schematically the cathode ray sphere control hardware.

A schematic diagram of the CRS control hardware is shown in FIG. 8. The computer card controls the blanking and deflection amplifiers driving the electron guns which address the display volume. The blanking amplifiers, floating at approximately −4 kV are isolated from the computer card via fibre-optic isolation.

Figure 14:
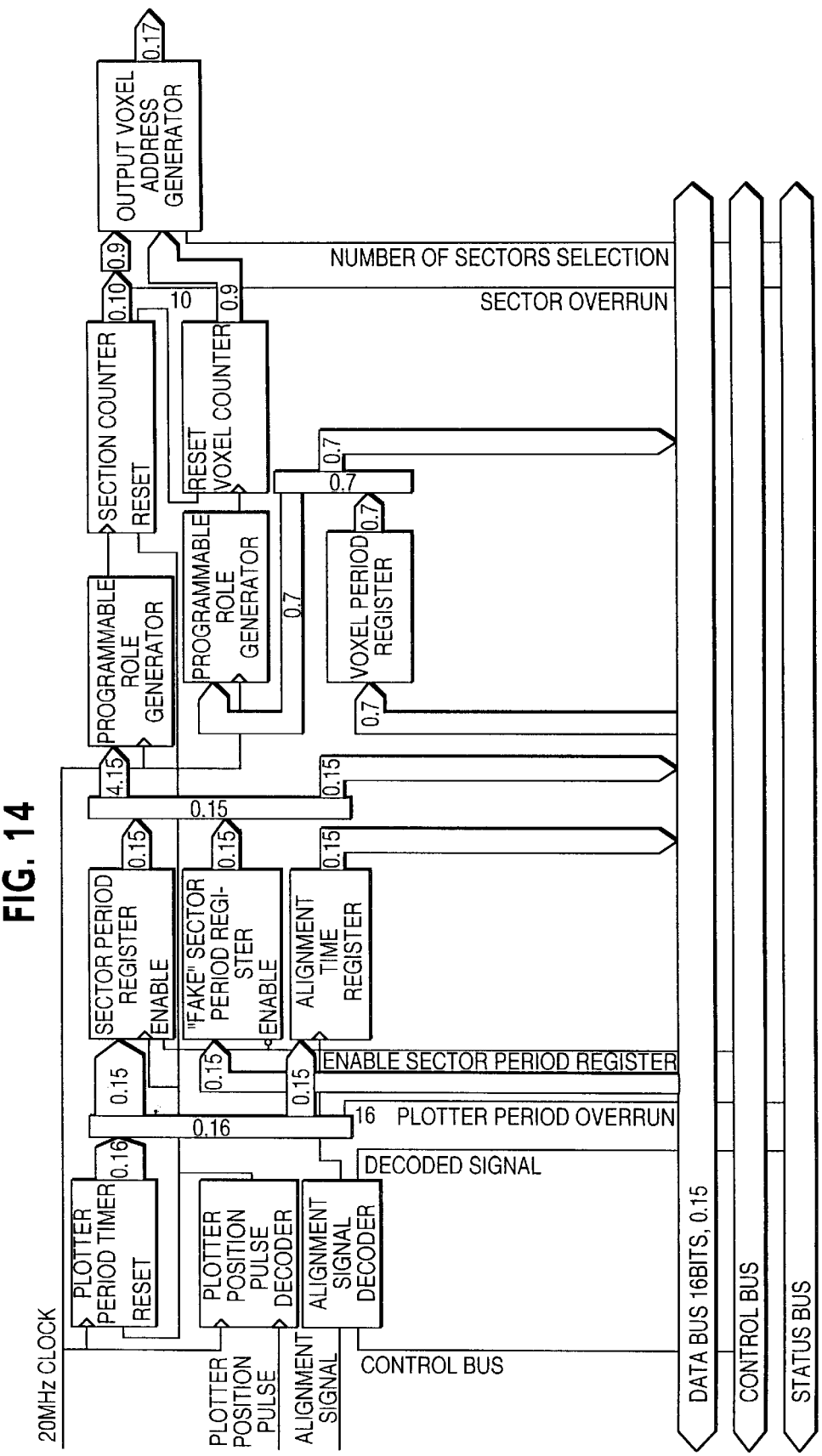
FIG. 14 Illustrates a schematic layout of the main control card for use with a three dimensional display system and shows registers able to modify many of the image characteristics such as brightness.

A detail of the computer card is shown in FIG. 14. The card itself and consequently the computer, receive feedback from the display on the screen (2 pulses per screen revolution) and the beam current impinging on the screen. As described in PCT/NZ93/00083, the timing signal (referred to as the indexing signal in the aforementioned specification) may be generated when a laser beam is detected through a bore in the rotating shaft supporting the phosphor coated screen. The above document describes a technique whereby the bore may be drilled at an angle slightly less than transverse to the axis of shaft so that only one pulse is generated per revolution. In the present system, the hole is drilled with precision through the centre of the shaft and the indexing signal filtered to provide the desired frequency signal. This is done by feeding the indexing signal train through a divide by 2 and altering it's phase by 180°. The initial conditions will define which side of the screen the beam will address on startup, however, the phase may be selected by the user. Thus colour changes may be effected for coating configurations which provide different phosphor types arranged on the sides of the screen. The indexing signal is also used for the beam registration technique described above.

Figure 9:
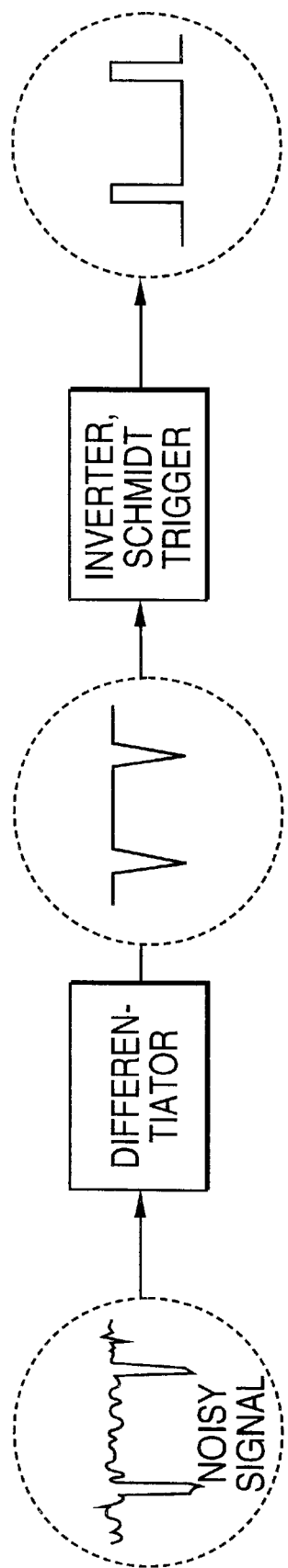
FIG. 9 Illustrates the filtering process applied to a signal produced by the electron scan passing over a conductor located on the screen perimeter.

If the beam detection conductor is placed around the periphery of the screen, the signal extracted from the beam detection circuitry will comprise sequential pulses and background noise (see FIG. 9). The noisy signal train is passed through a differentiator thereby extracting the pulses and providing a 'clean' signal for subsequent processing.

Figure 11:
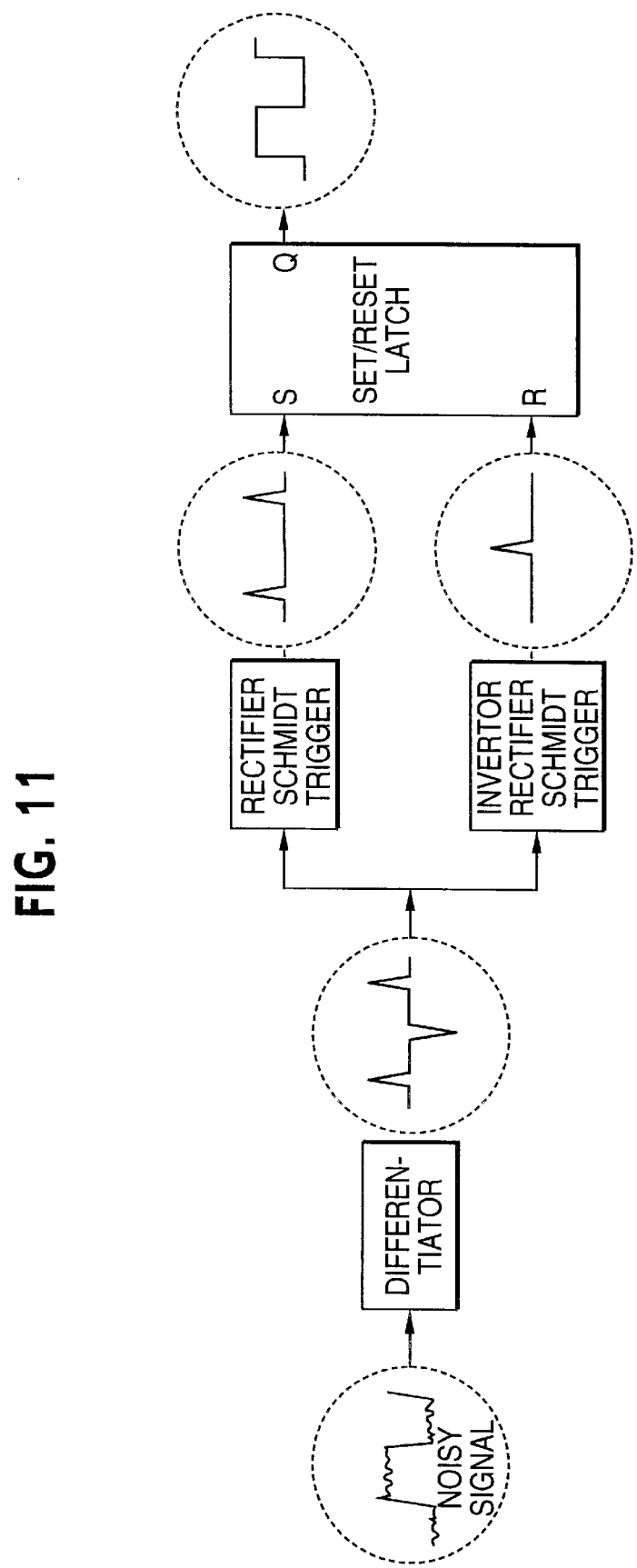
FIG. 11 Illustrates the filtering process applied to a signal produced by the electron scan passing over a conducting layer covering the entire face of the screen.

If the screen is coated completely with a conductive material, as the beam scans across it, the signal received from the screen via the detection electronics, will consist of alternate high and low voltage signals (see FIG. 11). The beam registration procedure requires information relating to when the beam leaves and enters the display volume. If the signal from the screen is differentiated passed through a differentiator, the edge positions can be extracted. The output signal comprises alternate positive and negative pulses corresponding to the leading and trailing edges of the screen signal. The negative signal pulses are inverted to provide a signal train with all positive pulses. The time distribution of the positive pulses is used by the beam registration algorithm.

The blanking circuit employs a fibre-optic link to isolate the blanking amplifiers (which float at ~−4 kV with the cathode voltage) from the circuit that is associated with the control electronics units and communicates with the control card.

Figure 10:
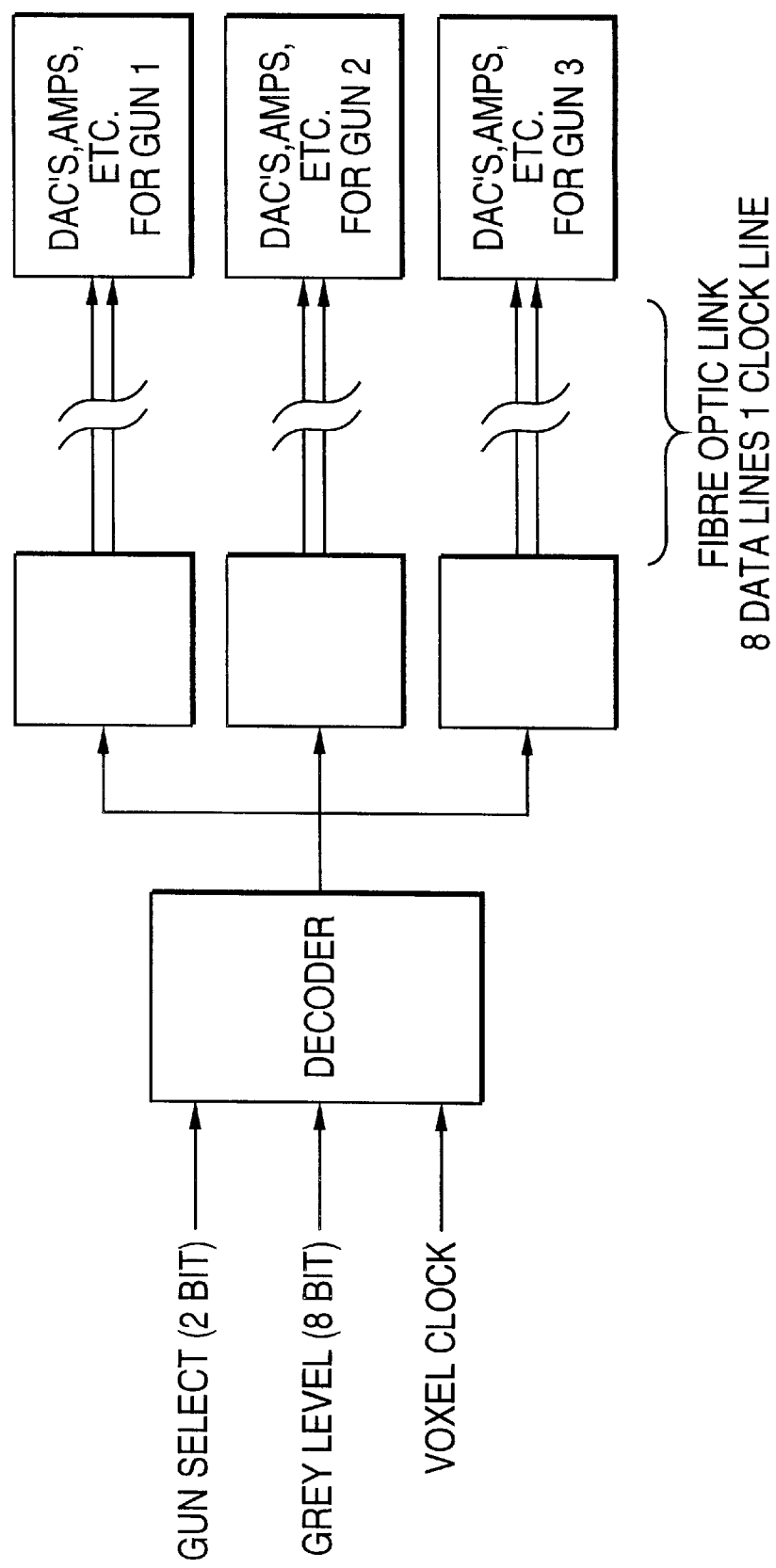
FIG. 10 Illustrates schematically a circuit employing fibre optic isolation, providing intensity modulation to the beam.

With reference to FIG. 10, the circuit operates as follows. Each gun is identified by a two bit. Gun select code allowing the identification of the gun to which the blanking information is provided. 00 corresponds to gun 1, 01 to gun 2 and 10 to gun 3. The combination 11 sends the blanking information to all electron guns. The blanking information itself is encoded separately, for example, 8-bit precision. Grey level code producing 256 intensity levels. This information is passed through the fibre-optic link to D/A converters and the blanking amplifiers. A voltage of ~−100 V relative to the cathode voltage is sufficient to extinguish the beam current totally.

The memory configuration as described in PCT/NZ93/00083 implements two RAM banks whereby an image is written to one bank whilst the image data is being retrieved from the other bank of RAM. A modified memory configuration is proposed which takes advantage of the sequence of operation of the each of the three electron guns.

At any one time there will be generally no more than one electron gun addressing the display volume. This leaves two guns inactive. This feature can be exploited by having a separate control card for each electron gun, where each card incorporates a bank of RAM. Generally, 2 out of 3 of the RAM banks will be idle for 2/3 of the time with the remaining 1 bank dedicated to writing to the display volume. This technique avoids the need for the 'flipped RAM bank' approach of PCT/NZ93/00083 and provides advantages in respect of data processing speed.

A consequence of the behaviour of charged particles moving in electromagnetic fields is that the deflection sensitivity of the electron beam decreases as the accelerating voltage increases. For higher electron velocities, a higher deflection voltage is required to scan the beam in a given direction. However, a high energy electron beam is desirable in order to ensure adequate voxel brightness, as more energetic electrons create more fluorescence in the phosphor coating.

One method of retaining a high deflection sensitivity of the electron beam, while maintaining a high beam energy is to accelerate the electron beam after it has been deflected. This process is known as post-deflection-acceleration (PDA). Such techniques are known in the art. Several PDA techniques use meshes, and this approach is most suited to the cathode ray sphere. Other approaches are problematic for the following reasons: The screen is in constant motion and is therefore unsuitable to be used to maintain a post-deflection-acceleration potential through which the electrons move. Furthermore, the tube walls do not continue to the periphery of the screen, also restricting the application of potentials thereto to define electrostatic boundary conditions to the electrons path.

Figure 12:
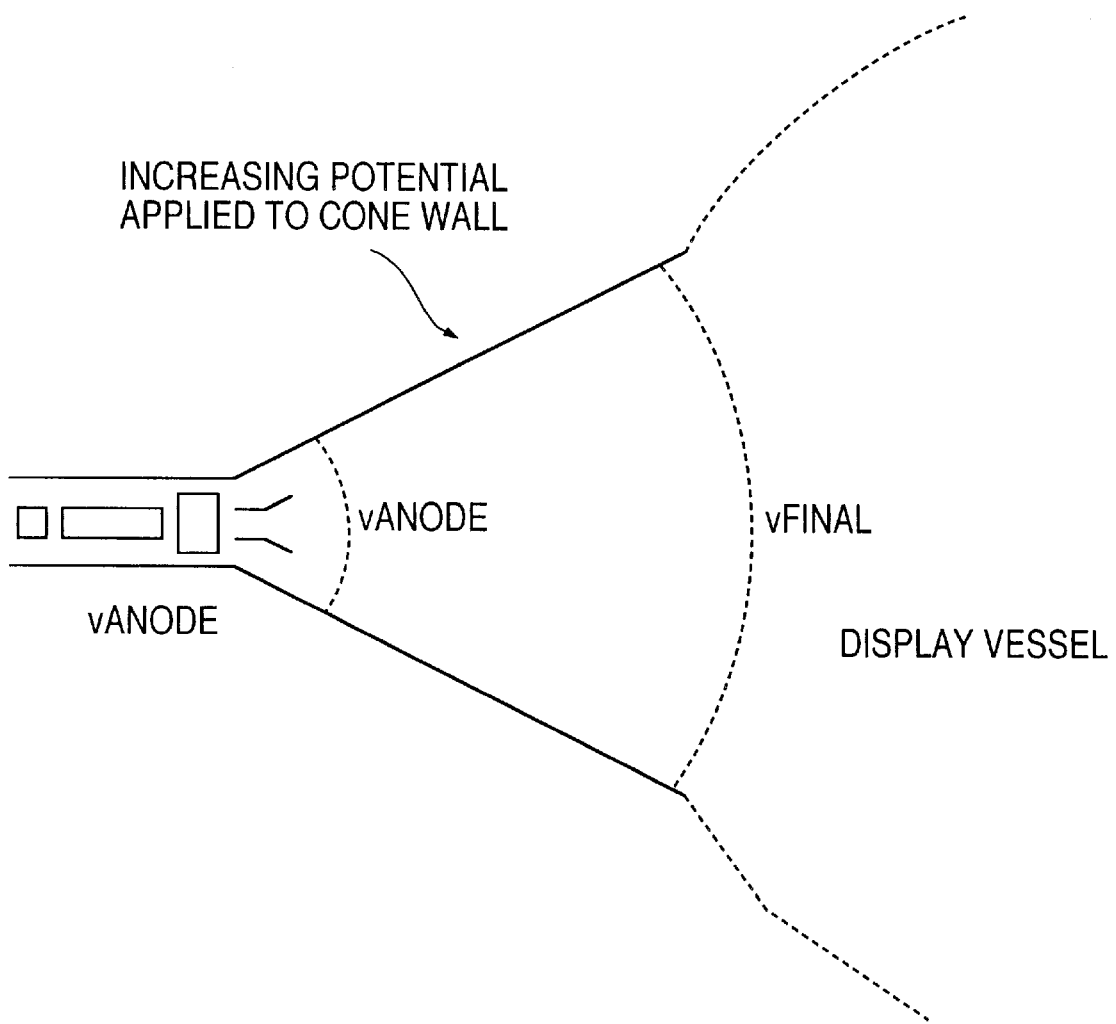
FIG. 12 Illustrates a post deflection electron acceleration (PDA) means.

One method by which a PDA technique can be applied to the cathode ray sphere, is to create an accelerating potential between two meshes (see FIG. 12) within the electron gun cone. The first mesh that the electron beam would encounter would typically be at the same potential as the electron gun (Vanode in FIG. 12). However, the second mesh would be at a higher potential (Vfinal) thereby applying PDA to the electron beam. The potential inside this region may be further defined by the application of an interpolating potential to a conductive coating around the entrance cone itself. This is similar to a PDA technique used in cathode ray tubes, except in that configuration, the final potential is defined by the voltage on the screen itself rather than the second mesh.

A problem with this technique is that the beam current is attenuated by ~90% as the beam passes through each mesh. Therefore the electron beam current exiting the second mesh is greatly reduced in comparison with the original beam current emitted from the electron gun.

A further known problem with cathode ray tubes is that the trajectory of an undeflected electron inside the enclosure is not exactly linear. Due to extraneous magnetic fields (for example the earth's magnetic field), electrons are deflected and will tend to follow non-linear paths. Such paths can be described by a quadratic equartion. A solution to this is proposed, whereby a cathode ray sphere is calibrated for a particular environment by fitting a curve to the quadratic trajectory, whereby all beams transmitted through the display volume are corrected for path bending induced by outside magnetic fields. The information needed for fitting the curve could be extracted from edge measurements for various screen positions within the display volume. In this way the actual path of the electron beam can be compared with the ideal linear path and an appropriate correction made. Such a calibration would only need to be performed when the display system is set up, moved or otherwise subjected to a different magnetic environment. Also, use of PDA will reduce the significance of the Earth's magnetic field due to the electrons having a higher energy.

Although the invention has been described by way of example and with reference to possible embodiments thereof, it is to be appreciated that improvements and/or modifications may be made thereto without departing from the scope and spirit of the invention as set out in the appended claims.

Where in the foregoing description reference has been made to integers or components having known equivalents then such equivalents are herein incorporated as if individually set forth.

I claim:

1. A display system comprising:
   an evacuated enclosure, at least part of that enclosure being transparent;
   a phosphor coated screen within the enclosure;
   means to rotate the screen within the enclosure so that the screen sweeps out a display volume;
   one or more electron guns within the enclosure positioned so that images may be written to the screen as it sweeps out the display volume; and
   control means to provide drive signals to the one or more electron guns in accordance with the image information supplied thereto, wherein deflection coordinates defining the spatial location of the images are determined by transformation from a coordinate system based on the display volume to a coordinate system based on the one or more electron guns, the transformation determined by means of a matrix, the matrix comprising elements corresponding to:
   the horizontal component of a separation of the origins of the two coordinate systems;

the vertical component of the separation;

the angle of rotation of the one or more electron guns about the one or more electron guns own axis; and the screen angle.

2. A display system as claimed in claim 1 wherein the determination of the matrix elements is repeated a plurality of times from a number of locations around the screen and may be subsequently averaged.

3. A display system comprising:

an evacuated enclosure, at least part of the enclosure being transparent;

a screen within the enclosure, the screen being rotatable so that the screen sweeps out a display volume, at least one face of the screen having a phosphor coating and at least one face of the screen having a conductive coating;

one or more electron guns within the enclosure positioned so that images may be written to the screen as it sweeps out the display volume; and control means to provide drive signals to the one or more electron guns in accordance with the image information supplied thereto, wherein deflection coordinates defining the spatial location of the images are determined by transformation from a coordinate system based on the display volume to a coordinate system based on the one or more electron guns;

wherein the conductive coating on the screen provides a signal when an electron beam impinges upon the screen to detect the presence of an electron beam within the display volume.

4. A display system as claimed in claim 3 wherein the conductive coating is adapted to be translucent or transparent.

5. A display system as claimed in claim 3 wherein the conductive coating is disposed between the screen and the phosphor coating.

6. A display system comprising:

an evacuated enclosure, at least part of the enclosure being transparent;

a phosphor coated screen within the enclosure;

means to rotate the screen within the enclosure so that the screen sweeps out a display volume;

one or more electron guns within the enclosure positioned so that images may be written to the screen as it sweeps out the display volume; and control means to provide drive signals to the one or more electron guns in accordance with the image information supplied thereto, wherein deflection coordinates defining the spatial location of the images are determined by transformation from a coordinate system based on the display volume to a coordinate system based on the one or more electron guns; and one or more areas of conductive material applied to at least a portion of the interior or exterior surface of the evacuated enclosure, the conductive material adapted to provide a signal when an electron beam impinges upon the enclosure interior surface.

7. A display system as claimed in claim 6 wherein the conductive coating on the enclosure interior or exterior surface is transparent or translucent.

8. A display system as claimed in claim 6 wherein the conductive coating comprises a metal or a metallic compound, the conductive coating being produced by vacuum deposition or a similar technique known in the art.

9. A display system as claimed in claim 5 wherein the conductive coating is on top of the phosphor coating.

10. A display system as claimed in claim 2 wherein at least one face of the screen has a conductive coating for providing a signal when an electron beam impinges upon the screen to detect the presence of the electron beam within the display volume.

11. A display system as claimed in claim 2 further comprising a conductive material applied to at least a portion of the interior or exterior surface of the enclosure, the conductive material adapted to provide a signal when an electron beam impinges upon the interior surface of the enclosure.

12. A display system comprising:

an enclosure, at least part of the enclosure being transparent;

a screen within the enclosure, the screen being rotatable so that the screen sweeps out a display volume and at least one face of the screen having a phosphor coating;

a computer for receiving image information and generating a digital signal defining the spatial location of the image;

at least one digital to analog converter for converting the digital signal to an analog signal;

at least one amplifier for amplifying the analog signal to generate a drive signal; and at least one electron gun for receiving the drive signal and generating an image on the screen;

wherein the computer is programmed to convert the image information from a coordinate system based on the display volume to a coordinate system based on the at least one electron gun, the conversion comprising a matrix calculation wherein the matrix comprises elements corresponding to:

a horizontal component of a separation of the origins of the two coordinate systems;

a vertical component of the separation;

an angle of rotation of at least one electron gun relative to the display volume coordinate system; and an angle of rotation of the screen.

13. A display system as claimed in claim 12 wherein the determination of the matrix elements is repeated a plurality of times from a number of locations around the screen and may be subsequently averaged.

14. The display system as claimed in claim 12 wherein at least one face of the screen has a conductive coating for providing a signal when an electron beam impinges upon the screen to detect the presence of an electron beam within the display volume.

15. The display system as claimed in claim 12 further comprising one or more areas of conductive material applied to at least a portion of the interior or exterior surface of the enclosure, the conductive material adapted to provide a signal when an electron beam impinges upon the enclosure interior surface.

16. A method of displaying a three-dimensional image on a phosphor coated screen, the screen being rotatable so that the screen sweeps out a display volume, the image being formed by one or more electron guns positioned so that images may be written to the screen as it sweeps out the display volume, the method comprising:

defining a first coordinate system based on the display volume;

generating image information defining the image based on the first coordinate system;

defining a second coordinate system based on the one or more electron guns;

defining a matrix comprising elements corresponding to:
- a horizontal component of a separation of the origins of the first and second coordinate systems,
- a vertical component of the separation,
- an angle of rotation of the one or more electron guns relative to the first coordinate system, and
- an angle of rotation of the screen;

using the matrix to convert the image information from the first coordinate system to the second coordinate system to generate a drive signal; and supplying the drive signal to the one or more electron guns to generate one or more electron beams to form the image.

17. A method as claimed in claim 16 wherein the determination of the matrix elements is repeated a plurality of times from a number of locations around the screen and may be subsequently averaged.

18. The method as claimed in claim 16 wherein at least one face of the screen has a conductive coating for providing a second signal when one of the electron beams impinges upon the screen, the method further comprising:

detecting the presence of one of the electron beams within the display volume by detecting the second signal.

19. The method as claimed in claim 16 wherein a conductive material is applied to at least a portion of the interior or exterior surface of the enclosure, the conductive material adapted to provide a third signal when one of the electron beams impinges upon the interior surface of the enclosure, the method further comprising:

detecting when one of the electron beams is not directed within the display volume by detecting the third signal.

* * * * *